United States Patent
Kwon et al.

(10) Patent No.: US 8,486,558 B2
(45) Date of Patent: Jul. 16, 2013

(54) CABLE-TYPE SECONDARY BATTERY

(75) Inventors: Yo-Han Kwon, Daejeon (KR);
Je-Young Kim, Daejeon (KR);
Heon-Cheol Shin, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/363,640

(22) Filed: Feb. 1, 2012

(65) Prior Publication Data

US 2012/0135299 A1    May 31, 2012

Related U.S. Application Data

(63) Continuation of application No. PCT/KR2011/007623, filed on Oct. 13, 2011.

(30) Foreign Application Priority Data

Oct. 19, 2010    (KR) .................. 10-2010-0101888

(51) Int. Cl.
*H01M 6/12*    (2006.01)
*H01M 6/00*    (2006.01)

(52) U.S. Cl.
USPC ............................................ 429/162; 429/127

(58) Field of Classification Search
None
See application file for complete search history.

(56) References Cited

U.S. PATENT DOCUMENTS

2004/0265690 A1 * 12/2004 Chen ................... 429/209

FOREIGN PATENT DOCUMENTS

| JP | 04169066 A | * | 6/1992 |
| JP | 08-088019 A | | 4/1996 |
| JP | 3047778 B2 | | 3/2000 |
| KR | 10-0625892 B1 | | 9/2006 |
| KR | 10-0742739 B1 | | 7/2007 |
| KR | 10-0804411 B1 | | 2/2008 |
| WO | WO 2005098994 A1 | * | 10/2005 |

* cited by examiner

*Primary Examiner* — Ula C Ruddock
*Assistant Examiner* — Daniel Gatewood
(74) *Attorney, Agent, or Firm* — Birch, Stewart, Kolasch & Birch, LLP

(57) ABSTRACT

Provided is a cable-type secondary battery including an electrode assembly and a cover member surrounding the electrode assembly, the electrode assembly including first and second electrodes of an elongated shape and a separator or an electrolyte interposed between the first and second electrodes, each electrode including a current collector having a cross section of a circular, asymmetrical oval or polygonal shape perpendicular to the lengthwise direction thereof and an electrode active material applied onto the surface of the current collector, wherein the cover member has at least partially a predetermined concavo-convex pattern in the direction of the electrode assembly.

The cover member of a concavo-convex pattern may improve the flexibility of the cable-type secondary battery. When the cover member is applied to an electrode active material pattern layer, the flexibility of the cable-type secondary battery may be further improved.

16 Claims, 1 Drawing Sheet

CABLE-TYPE SECONDARY BATTERY

CROSS-REFERENCE TO RELATED APPLICATION(S)

This application is a continuation of International Application No. PCT/KR2011/007623 filed on Oct. 13, 2011, which claims priority to Korean Patent Application No. 10-2010-0101888 filed in the Republic of Korea on Oct. 19, 2010, the entire contents of which are incorporated herein by reference.

BACKGROUND

1. Technical Field

The present invention relates to a cable-type secondary battery of free shape adaptation, and more particularly, to a cable-type secondary battery with a coating (cover member) of an improved structure surrounding a cable-type electrode assembly.

2. Background Art

Recently, advances in wireless communication technologies have led to the popularization of mobile devices, and to keep pace with this trend, there is a strong tendency to use secondary batteries as a power source of mobile devices. Secondary batteries are also used as a power source of environmentally friendly next-generation vehicles such as electric vehicles and hybrid vehicles.

As described above, as the use of secondary batteries is dramatically increasing in many fields of industry, secondary batteries are varying in output, capacity, structure, and the like, depending on the characteristics of the field where the secondary batteries are used.

Generally, a secondary battery is provided with an electrode assembly including a cathode and an anode, each having a plate-like current collector surface-coated with an active material, and a separator interposed between the cathode and the anode. The electrode assembly is received in a cylindrical or prismatic metal casing or a pouch-type casing of an aluminum laminate sheet, together with a liquid electrolyte or a solid electrolyte. To improve the capacity of the secondary battery, the electrode assembly may be a jelly-roll type in which a cathode sheet, a separator sheet, and an anode sheet are rolled together, or a stack-type in which a plurality of unit electrodes of a thin plate shape are sequentially stacked. Accordingly, the electrode (cathode and anode) of the electrode assembly has a substantially plate-like structure.

The conventional plate-like electrode structure is advantageous in that it has a high degree of integration when rolling or stacking, but has difficulty in adaptively changing the structure to meet the demand of the industrial field. Furthermore, the plate-like electrode structure has various problems in that it is sensitive to the change in volume of the electrode during charging/discharging, the gas generated in the cell may not easily discharge, and the potential difference between the electrodes may increase.

Particularly, to meet the various needs of the users, the kinds of devices using secondary batteries are diversifying and a lot of emphasis is put on designing such devices. However, devices having a special shape need to offer a separate portion or space for mounting secondary batteries having a traditional structure and/or shape (cylindrical, prismatic, or pouch-type), which becomes a great obstacle when expanding the wireless technologies and developing new designs. For example, when a newly developed device has an elongated space for mounting a secondary battery, it is substantially impossible or very inefficient to structurally change the secondary battery including an electrode assembly made up of existing plate-like electrodes to suit the structure to the mounting space. In other words, since the conventional cylindrical, coin-type, and prismatic batteries have specific shapes, the batteries are limited in its use and ability to freely deform. Accordingly, it is difficult to adaptively deform, for example, twist or bend, depending on where the batteries are used.

To solve these problems, the inventors have disclosed Korean Patent No. 10-0804411 (filed Jan. 17, 2006, registered Feb. 12, 2008) titled "electrode assembly of novel structure and secondary battery comprising the same".

However, this secondary battery (hereinafter referred to as a cable-type secondary battery) still has insufficient flexibility. Also, when a cable-type secondary battery is deformed by an excessive external force, an active material may fall off from an active material layer.

DISCLOSURE

Technical Problem

It is an object of the present invention to provide a secondary battery of an improved structure that is easily adaptable in shape to maintain stability and excellent performance.

Technical Solution

A cable-type secondary battery of the present invention may include an electrode assembly and a cover member surrounding the electrode assembly, the electrode assembly including first and second electrodes of an elongated shape and a separator or an electrolyte interposed between the first and second electrodes, each electrode including a current collector having a cross section of a circular, asymmetrical oval or polygonal shape perpendicular to the lengthwise direction thereof and an electrode active material applied onto the surface of the current collector, wherein the cover member has at least partially a predetermined concavo-convex pattern in the direction of the electrode assembly. The concavo-convex pattern is not limited to a specific shaped pattern, but may be a serrated pattern.

In the cable-type secondary battery of the present invention, the electrode assembly may include a first current collector, a first active material layer formed from a first active material spaced away at a predetermined interval on the outer surface of the first current collector, an electrolyte layer surrounding the first active material layer, a second active material layer formed from a second active material corresponding to the first active material on the outer surface of the electrolyte layer, and a second current collector surrounding the second active material layer. The cover member may have a shape corresponding to those of the first and second active material layers.

In this instance, the first electrode may be an anode, and the second electrode may be a cathode.

Preferably, the current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers. The conductive material may be polyacetylene, polyaniline, polypyrrole, polythiophene, polysulfur nitride, indium thin oxide (ITO), copper, silver, palladium, or nickel. The conductive polymer may be polyacetylene, polyaniline, polypyrrole, polythiophene, polysulfur, or nitride.

The anode active material may include an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof. The cathode active material may include an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from an electrolyte selected from the group consisting of a gel polymer electrolyte of polyethylene oxide (PEO), polyvinylidene fluoride (PVdF), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

In the cable-type secondary battery of the present invention, the electrolyte layer may further include a lithium salt. The lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, or tetra phenyl lithium borate.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
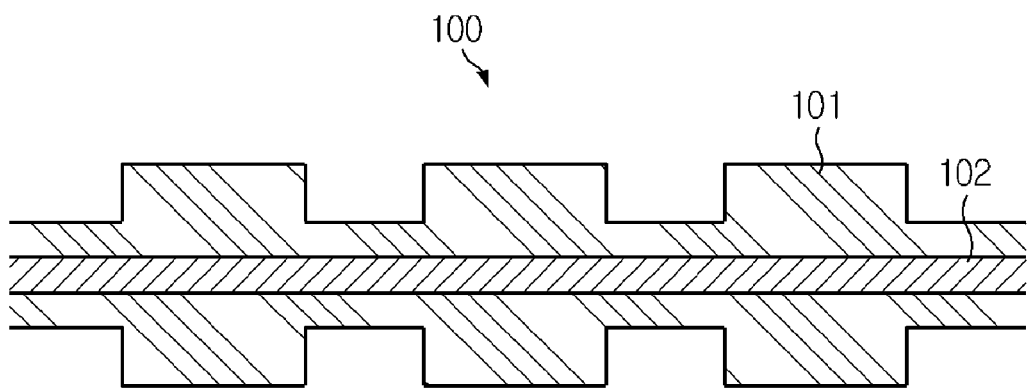
FIG. 1 is a cross-sectional view of a cable-type secondary battery according to an embodiment of the present invention.
Figure 2:
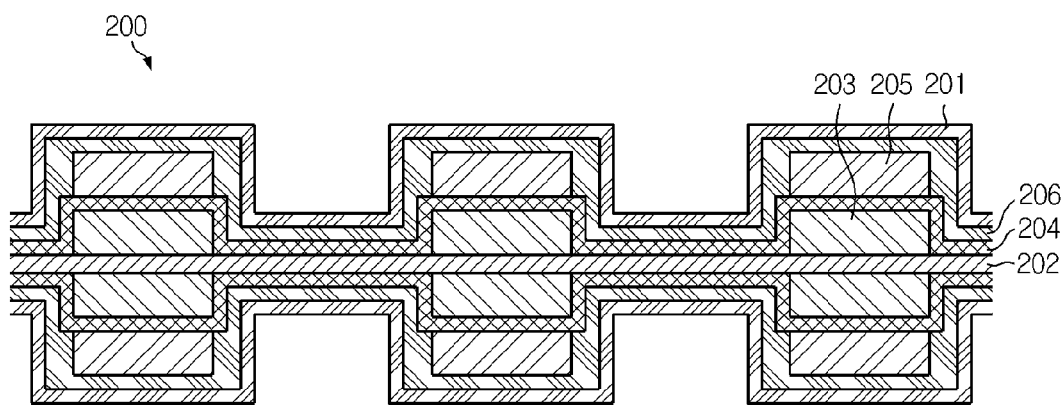
FIG. 2 is a cross-sectional view of a cable-type secondary battery with an active material pattern layer according to an embodiment of the present invention.

A cable-type secondary battery according to the present invention is schematically illustrated in FIGS. 1 and 2. Although a few exemplary embodiments of the present invention are shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Referring to FIG. 1, a cable-type secondary battery 100 according to an embodiment of the present invention may include an electrode assembly 102 and a cover member 101 surrounding the electrode assembly 102, the electrode assembly 102 including first and second electrodes of an elongated shape and a separator or an electrolyte interposed between the first and second electrodes, each electrode including a current collector having a cross section of a circular, asymmetrical oval or polygonal shape perpendicular to the lengthwise direction thereof and an electrode active material applied onto the surface of the current collector. The cover member 101 may have at least partially a predetermined concavo-convex pattern in the direction of the electrode assembly 102. The concavo-convex pattern is not limited to a specific shaped pattern, but may be a serrated pattern.

The cable-type secondary battery of the present invention has flexibility and a linear structure extending longitudinally, so it is freely adaptable in shape.

The electrode assembly 102 of the present invention is not limited to a specific type, and may be any type of electrode assembly including a cathode and an anode and a separator or an electrolyte as an ion channel between the cathode and the anode, to allow a general electrochemical reaction. In this instance, the cathode is made up of a cathode current collector and a cathode active material, and the anode is made up of an anode current collector and an anode active material.

The cover member 101 surrounding the electrode assembly 102 may have at least partially a predetermined concavo-convex pattern, preferably a serrated pattern in the direction of the electrode assembly 102, to improve the flexibility of the cable-type secondary battery. The concave portion of the cover member 101 of a concavo-convex pattern has excellent flexibility, and thus may improve the flexibility of the entire cable-type secondary battery, and the convex portion responds to an external stimulation earlier, and thus may protect the cable-type secondary battery from the physical impact. Accordingly, the cover member 101 may improve the flexibility of the cable-type secondary battery while protecting the cable-type secondary battery.

The cover member 101 of the present invention may be formed on the outer surface of the outer current collector, and may serve as an insulator to protect the electrode from moisture in the air or from external impact. The cover member 101 may be formed from typical polymer resins, for example, polyvinyl chloride (PVC), high-density polyethylene (HDPE), or epoxy resin.

The electrode assembly 102 of the present invention may include an active material pattern layer formed from an electrode active material spaced away at a predetermined interval.

Referring to FIG. 2, an electrode assembly may include a first current collector 202, a first active material layer 203 formed from a first active material spaced away at a predetermined interval on the outer surface of the first current collector 202, an electrolyte layer 204 surrounding the first active material layer 203, a second active material layer 205 formed from a second active material corresponding to the first active material on the outer surface of the electrolyte layer 204, and a second current collector 206 surrounding the second active material layer 205. Preferably, a cover member 201 may have a shape corresponding to those of the first active material layer 203 and the second active material layer 205. An electrode active material layer of a second battery includes an electrode active material, a binder, and a conductive material, and forms an electrode with a current collector. When the electrode deforms by an external force, particularly the electrode is crushed or broken, the electrode active material may fall off from the electrode active material layer. However, the electrode assembly of the present invention has the electrode active material pattern layer in which a portion not provided with the electrode active material deforms earlier when an excessive external force is applied, the electrode active material layer is less subject to deformation, thereby preventing the electrode active material from falling off from the electrode active material layer.

Preferably, the current collector is made from stainless steel, aluminum, nickel, titanium, sintered carbon, or copper; stainless steel surface-treated with carbon, nickel, titanium, or silver; aluminum-cadmium alloys; non-conductive polymers surface-treated with a conductive material; or conductive polymers. The conductive material may be polyacetylene, polyaniline, polypyrrole, polythiophene, polysulfur nitride, indium thin oxide (ITO), copper, silver, palladium, or nickel. The conductive polymer may be polyacetylene, polyaniline, polypyrrole, polythiophene, or polysulfur nitride.

The anode active material may include, but is not limited to, natural graphite, artificial graphite, carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid polymer electrolyte of PEO, polypropylene oxide (PPO), polyethylene imine (PEI), polyethylene sulphide (PES), or PVAc.

In the cable-type secondary battery of the present invention, the electrolyte layer may further include a lithium salt. The lithium salt may include, but is not limited to, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra phenyl lithium borate.

Hereinafter, a method for fabricating the foregoing cable-type secondary battery is briefly described below.

The cable-type secondary battery 100 according to an embodiment of the present invention may include the electrode assembly 102 and the cover member 101 surrounding the electrode assembly 102, the electrode assembly 102 including an anode and a cathode of an elongated shape and a separator or an electrolyte layer interposed between the anode and the cathode, the anode or the cathode including a current collector having a cross section of a circular, asymmetrical oval or polygonal shape perpendicular to the lengthwise direction thereof and an electrode active material applied onto the surface of the current collector. The cover member 101 may have at least partially a predetermined serrated pattern in the direction of the electrode assembly 102.

First, the wire-type linear anode current collector is prepared and surface-coated with the anode active material layer. In this instance, a typical coating process may be used, specifically an electroplating process or an anodic oxidation process. Also, extrusion-coating of an electrode slurry including an active material through an extruder may be used to maintain a regular interval.

Subsequently, the anode active material layer is surface-coated with the electrolyte layer. In this instance, a process for forming the electrolyte layer is not specially limited, however extrusion-coating is advantageous in fabricating the cable-type linear secondary battery due to the characteristics of the battery.

Then, the electrolyte layer is surface-coated with the cathode active material layer. The same coating process as the anode active material layer may be applied to the cathode active material layer. Next, the pipe-type cathode current collector is formed on the outer surface of the cathode active material layer.

Finally, the cover member is formed on the outer surface of the pipe-type cathode current collector. The cover member is formed on the outmost surface and may act as an insulator to protect the electrode from moisture in the air or from external impact. The cover member may be made from typical polymer resins, for example, PVC, HDPE, or epoxy resin. In particular, the serrated pattern of the cover member according to the present invention may be formed through further processing after the cover member is formed, or may be formed using a mold having a corresponding serrated pattern when forming the cover member.

According to teachings above, the cable-type secondary battery of the present invention may have improved flexibility by protecting and/or coating the electrode assembly using the improved cover member of a concavo-convex pattern.

What is claimed is:

1. A cable-type secondary battery comprising:
   an electrode assembly; and
   a cover member surrounding the electrode assembly,
   the electrode assembly including:
   first and second electrodes of an elongated shape, each electrode including a current collector having a cross section of a circular, asymmetrical oval or polygonal shape perpendicular to the lengthwise direction thereof, and an electrode active material applied onto the surface of the current collector, and
   a separator or an electrolyte layer interposed between the first and second electrodes,
   wherein the cover member has at least partially a predetermined concavo-convex pattern in the direction of the electrode assembly.

2. The cable-type secondary battery according to claim 1, wherein the concavo-convex pattern is a serrated pattern.

3. The cable-type secondary battery according to claim 1, wherein the electrode assembly includes a first current collector, a first active material layer formed from a plurality of first active material layers spaced away at predetermined intervals on the first current collector, an electrolyte layer surrounding the first active material layer, a second active material layer formed from a second active material corresponding to the first active material on the electrolyte layer, and a second current collector surrounding the second active material layer, and
the cover member has a shape corresponding to those of the first and second active material layers.

4. The cable-type secondary battery according to claim 1, wherein the first electrode is an anode and the second electrode is a cathode.

5. The cable-type secondary battery according to claim 1, wherein the first active material includes an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

6. The cable-type secondary battery according to claim 1, wherein the second active material includes an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

7. The cable-type secondary battery according to claim 1, wherein the first current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

8. The cable-type secondary battery according to claim 1, wherein the second current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

9. The cable-type secondary battery according to claim 7, wherein the conductive material is any one selected from the group consisting of polyacetylene, polyaniline, polypyrrole, polythiophene, polysulfur nitride, indium thin oxide (ITO), copper, silver, palladium, and nickel, or mixtures thereof.

10. The cable-type secondary battery according to claim 7, wherein the conductive polymer is any one selected from the group consisting of polyacetylene, polyaniline, polypyrrole, polythiophene, and polysulfur nitride, or mixtures thereof.

11. The cable-type secondary battery according to claim 1, wherein the electrolyte layer is formed from an electrolyte selected from the group consisting of a gel polymer electrolyte of polyethylene oxide (PEO), polyvinylidene fluoride (PVdF), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

12. The cable-type secondary battery according to claim 1, wherein the electrolyte layer further includes a lithium salt.

13. The cable-type secondary battery according to claim 12, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra phenyl lithium borate, or mixtures thereof.

14. The cable-type secondary battery according to claim 8, wherein the conductive material is any one selected from the group consisting of polyacetylene, polyaniline, polypyrrole, polythiophene, polysulfur nitride, indium thin oxide (ITO), copper, silver, palladium, and nickel, or mixtures thereof.

15. The cable-type secondary battery according to claim 8, wherein the conductive polymer is any one selected from the group consisting of polyacetylene, polyaniline, polypyrrole, polythiophene, and polysulfur nitride, or mixtures thereof.

16. The cable-type secondary battery according to claim 1, wherein the second active material layer is formed from a plurality of second active material layers, each of the second active material layers being associated with a corresponding one of the plurality of first active material layers.

* * * * *